UNITED STATES PATENT OFFICE.

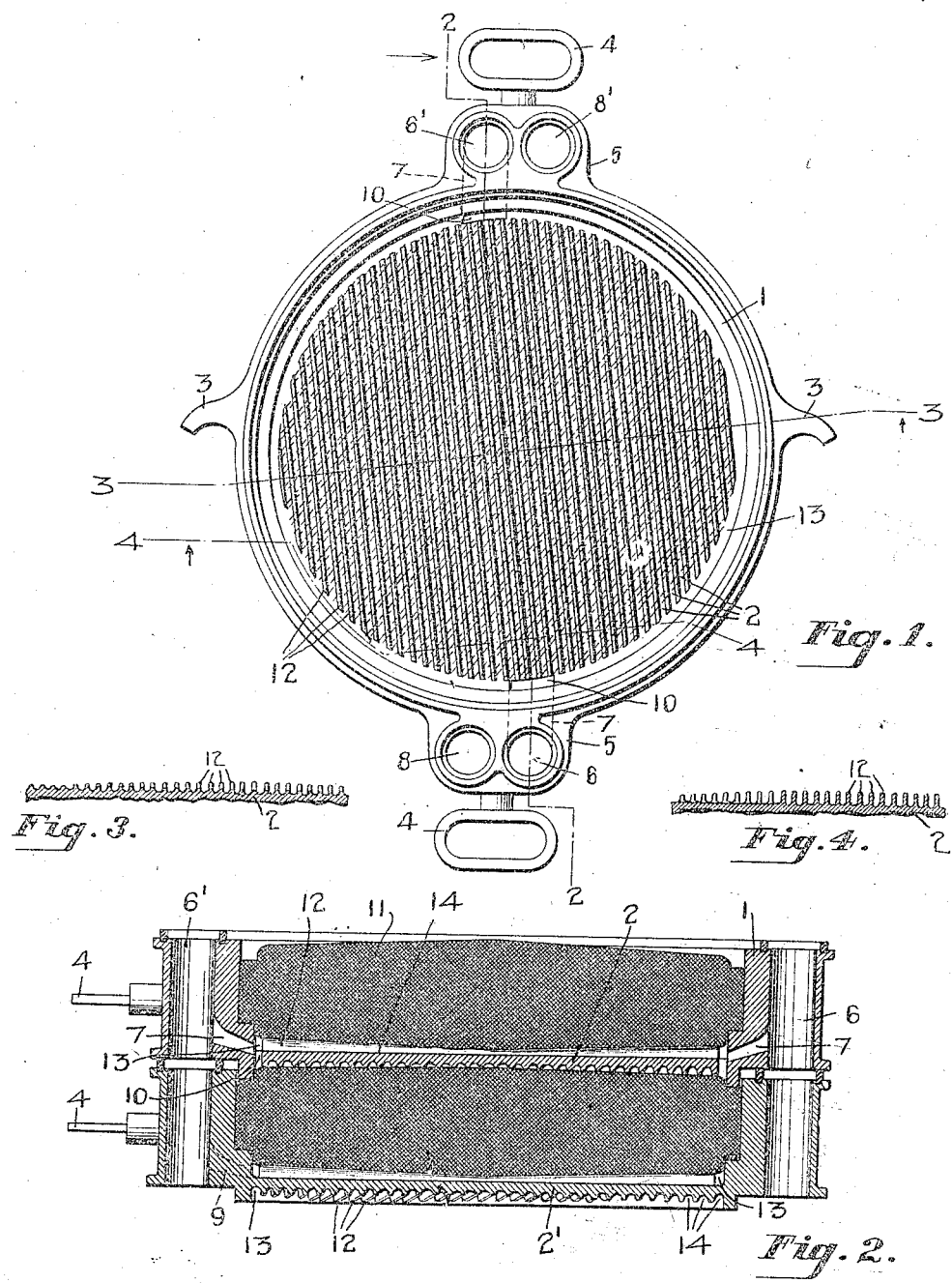

HEINRICH RABENSTEIN, OF MANNHEIM, GERMANY.

FILTER.

1,052,958.  Specification of Letters Patent.  Patented Feb. 11, 1913.

Application filed February 28, 1912. Serial No. 680,402.

*To all whom it may concern:*

Be it known that I, HEINRICH RABENSTEIN, a subject of the King of Prussia, residing at S. 6, No. 32, Mannheim, Germany, have invented the new and useful Improvements in Filters, hereinafter fully set forth.

The invention relates to a filter for liquids such as beer, and is more especially an improvement in that type of readily-separable and cleansible filter which is composed of a plurality of sections or individual filter elements compressed together in a suitable frame and forming when thus assembled a continuous filter drum with the filter mass and suitable longitudinal liquid inlet and outlet conduits contained therein. In filters of this character the filter elements are composed each of a shell wall and a bottom or septum wall, and each forms a chamber for the reception of filter mass. The septum walls perform the functions of distributing the turbid liquid to and collecting the clear liquid from the several filter cakes at opposite sides thereof; and to this end they are provided in their surfaces with a suitable number of channels suitably close together for conducting the liquid to or from a large part of the areas of the surfaces of the filter mass. In a desirable form of filter plate or wall these channels are formed by parallel ribs of such proximity (approximately less than a fiber's length from crest to crest) that the filter mass cannot pack into the intervening valleys, which constitute open or substantially open channels for the purposes of distribution and collection as above described. Part of the filter plates or walls, or the channels thereof, are in communication with the longitudinal liquid inlet conduit or conduits, while the remainder of the walls with their channels are in communication with the liquid outlet conduit or conduits. It is desirable to arrange the walls with the inlet-communicating or distributing walls alternating with the outlet-communicating or collecting walls. The channels traversing the surface of the walls are suitably placed in communication with their respective longitudinal conduits by means of their canals encircling the ribbed portions and suitable perforations made in the shell wall.

The object of this invention is to procure a uniform distribution of the unfiltered liquid to the filter mass and a uniform carrying-off of the filtered liquid therefrom; and the invention may be and preferably is applied to a filter element and filter of the kind described. To this end, the channels traversing the septum-walls are not of uniform cross-section throughout their lengths, nor are the ribs of uniform height throughout their lengths or the major portions thereof as heretofore, but the cross-section of each channel varies throughout its length in accordance with the flow of liquid therethrough, preferably by forming the ribs of greatest height adjacent the means of communication between the channels and the inlet or outlet conduit and of least height at the points remote therefrom, the ribs gradually decreasing or increasing in height between these extremes, according as they be regarded as extending from the inlet provisions or toward the outlet provisions. In the case of parallel ribs and channels terminating at their ends in an encircling canal, constituting a connection between the channels and the inlet or outlet conduit the channels increase in cross-section gradually from their centers to their ends, this being effected preferably by increasing the height of the ribs gradually from their centers to their ends.

Having thus briefly described the nature of the invention, reference will be had to the annexed drawings wherein an illustrative embodiment of the improvement is shown.

In the said drawings, Figure 1 is a face view of a filter element; Fig. 2 is a section through two elements of the drum on the line 2—2 of Fig. 1. Fig. 3 is a fragmentary section on the line 3—3 of Fig. 1. Fig. 4 is a similar section on the line 4—4 of Fig. 1.

The filter element illustrated comprises a shell or casing section 1 and a septum-plate or wall 2, which is permanently secured thereto in any suitable manner. The element is provided at its sides with hooks or ears 3 by means of which it is supported on rods of the frame (not shown) in the usual manner. The top and bottom is provided with suitable handles 4. The filter drum is provided with longitudinal inlet and outlet conduits, which are preferably formed in the extensions 5 of the shell 1, at top and bottom thereof, each extension being provided with two openings or perforations, constituting sections of the conduits when the filter elements are assembled to form the filter drum. The interior of each shell is in communication with only two of these conduits. Preferably, every other septum-wall 2 communicates with diagonally-opposite conduits 6 and 6¹ by means of passages 7, 7 through the walls of its shell. The remaining septum-walls communicate with the conduits 8 and 8¹ by means of similar passages 9, 9, one of which is indicated in Fig. 2. At the inner ends of the passages 7 and 9, openings 10 are formed through the walls, so that both sides thereof are placed in communication with the respective conduits. There may be only one inlet conduit and only one outlet conduit, in which case the conduits 6 and 8 at the bottom are preferably the inlets and outlets, while the conduits 6¹ and 8¹ at the top are both gas outlets for carrying away gases given off by the liquid within the chambers of the filter. If desired, however, the conduits 6 and 6¹ may be both liquid inlet conduits, and the conduits 8 and 8¹ both liquid outlets, in which case there will be two inlets to each of the distributing walls and two outlets for each of the collecting walls. For convenience in reference, a distributing wall is designated 2 in Fig. 2, and a collecting wall is designated 2¹, the filter mass, or filter cake being indicated at 11.

The faces of the several septum-walls are provided with parallel ribs 12 as hereinbefore referred to. These ribs form channels, the ends of which communicate with a canal 13, which may be a narrow and smooth or depressed surface, encircling the major ribbed portion of the surface. In accordance with the invention the channels 14 vary gradually in cross-section throughout their length being largest at their source or discharge ends, that is to say, at their ends communicating with the canal 13, and smallest at their portions remote from these ends, that is to say, in the construction shown, at their centers. To this end, the ribs 12 are preferably lowest at their centers and increase in height gradually to their outer ends. As shown, the bottoms of the channels or valleys 14 are preferably straight, that is not inclined or curved, since in this way a wall of minimum mass may be secured. Preferably the bottoms of all the channels at each side of a septum wall are in the same plane. As heretofore, the ribs and channels at opposite sides of each wall are preferably in crossing relation, so as to guard against weakening of the plate.

In the preferred manner of forming the channels 14, the tops of the ribs 12 all lie in the surface of a trough or hollow cylinder, using the latter term in its broader geometrical meaning. The low line of this troughed or cylindrical surface is normal to the length of the ribs and intersects them at their centers. In other words, the ribs are preferably all of the same height at their lowest points, that is to say, their centers, in the construction illustrated, and are also of the same height at any given distance from these centers or low points. Consequently, at their outer ends, the ribs are of unequal heights, since the ends of a shorter rib are of the same height as the points on a longer rib at the same distance from the center. It follows, therefore, that the outer ends of the channels 14 are of greater cross-section the longer the channel, and conversely, the shorter the channel the less its cross-section at the outer end. In other words, not only does the cross-section of each channel vary throughout its length according to the distances from the inlet or outlet provisions for the septum-wall, but the average cross-sections of the several channels are varied according to their length. However the several channels are of the same minimum cross-section at their centers, which may be regarded as their regions or ends most remote from the inlet or outlet provisions of the septum-wall. In this connection it may be observed that each channel extending across the plate may be regarded as a double channel, or two channels in longitudinal alinement, each single or half channel having one end at or adjacent the rim or margin of the plate or septum-wall and the other end at the transverse diameter thereof. Thus it will be seen that each channel varies in cross-section throughout its length approximately in proportion to the quantity of flow at different points therein, and furthermore, the capacities of the several channels are varied approximately in proportion to the quantities which they must carry in order to distribute liquid uniformly to or collect it uniformly from all parts of the filter mass.

In the drawings, for convenience in forming the section of Fig. 2, the channels 14 on the upper surface of the wall 2 are shown in parallelism to the diameter extending between the passages 7, 7. It will be understood that this may or may not be the case in actual practice. Fig. 2 shows but two sections of a filter drum, but it will be understood that a drum may be made up of any suitable number of sections, and that a complete drum would be but a multiplication of the showing of this view, with the addition of end members, suitable forms of which are well known. By this construction the unfiltered liquid flowing into each distributing wall 2 from the inlet conduit or conduits finds channels 14 which are of maximum cross-section at their inner ends, and decrease in cross-section in proportion as the liquid flows along them and passes into the filter mass. Conversely, the filtered liquid emerging from the opposite sides of the several portions of the filter mass enter channels 14 of each collecting wall 2¹, these channels increasing in cross-section in proportion as the outflowing streams approach the intermediate connection 13 to the outlet conduit and are progressively augmented by the liquid emerging from the various portions of the filter cake.

The septum wall may be made of hard rubber or metal covered with rubber so as to be neutral to the liquid in contact therewith. The shell wall may be metal with rabbet joint-matching ends, between which the outer portion of the filter-mass is compressed to render the same impervious at this region.

The invention is also of advantage in connection with the cleansing of the filters by flushing them with water in the reverse direction to the flow of the liquid to be filtered. In filter plates having channels of the same cross-section throughout, the sediment or slimy dregs is apt to become packed so as to prevent successful back-washing. This is not the case with my filter plate wherein the area of the channels between the ribs increases in the direction of the flow of the wash-water.

What I claim as new is:

1. A filter plate having a parallel ribbed surface affording conducting channels, the ribs thereof being of increasing height from the center to the rim whereby the intervening channels correspondingly increase in depth.

2. A filter element constituting a section of a sectional drum filter, said element comprising a shell wall having sections of longitudinal inlet and outlet conduits therein and a ribbed septum-wall affording channels communicating with one kind of conduit, said ribs varying in height gradually from maximum at the portions of the channels which communicate with the conduits to minimum at the regions remote therefrom.

3. A sectional filter press comprising a plurality of filter plates having surfaces provided with parallel ribs affording narrow distributing and collecting channels, the distributing channels decreasing in cross-section gradually from their inlet ends and the collecting channels increasing in cross-section gradually toward their exit ends.

4. A sectional filter press comprising a plurality of filter plates, their surfaces provided with parallel ribs forming distributing and collecting channels communicating with the inlet and outlet at the margins of the plates, both the distributing and collecting channels increasing in depth gradually from their centers to their ends.

5. A filter plate having both surfaces formed with parallel ribs affording conducting channels, the ribs on both sides of the plate gradually increasing in height from their centers to their ends.

6. A filter plate having parallel ribs of unequal length extending across its surface and forming conducting channels, the said ribs increasing in height gradually from their centers to their ends so as to afford conducting channels the cross-sections of which vary in like manner, the cross-sections of the ends of the various channels also varying in accordance with their lengths.

In testimony whereof, I have signed this specification in the presence of two witnesses.

HEINRICH RABENSTEIN

Witnesses:
A. O. TITTMAN,
S. H. SHANK.